United States Patent [19]
Anzai et al.

[11] 3,973,175
[45] Aug. 3, 1976

[54] INDUCTION MOTOR SPEED CONTROL APPARATUS

[75] Inventors: Nobuo Anzai; Hiroshi Kamaike, both of Inazawa, Japan

[73] Assignee: Mitsubishi Denki Kabushiki Kaisha, Tokyo, Japan

[22] Filed: Dec. 18, 1973

[21] Appl. No.: 425,722

[30] Foreign Application Priority Data
Dec. 21, 1972 Japan............................... 47-128637

[52] U.S. Cl............................ 318/203 R; 318/211; 318/212; 318/227; 318/230
[51] Int. Cl.².......................................... H02P 1/40
[58] Field of Search................ 318/203 R, 204, 211, 318/212, 227, 230

[56] References Cited
UNITED STATES PATENTS

| | | | |
|---|---|---|---|
| 3,514,682 | 5/1970 | Corey................................... | 318/212 |
| 3,596,156 | 7/1971 | Davey.............................. | 318/203 R |
| 3,678,355 | 7/1972 | Bucek et al...................... | 318/203 R |
| 3,708,734 | 1/1973 | Rowe.................................. | 318/212 |

*Primary Examiner*—Gene Z. Rubinson
*Attorney, Agent, or Firm*—Oblon, Fisher, Spivak, McClelland & Maier

[57] ABSTRACT

An apparatus for controlling the speed of an induction motor is disclosed which comprises an induction motor, a load coupled to the induction motor which has a negative polarity, a difference signal generating device for generating a difference signal between a signal corresponding to the speed of the load and a predetermined speed command signal, a signal converting device for presetting, prior to the deceleration of the load, a signal necessary to allow the motor to produce a rotating torque corresponding to the load, a voltage applying device for applying to the motor a voltage corresponding to the difference signal while the load is being accelerated, and a saturation signal generating device for generating a signal which saturates the voltage applying device. A rated voltage is applied to the motor by the saturation signal after the load is accelerated, and the saturation signal ceases at the beginning of decelerating the load. The motor is thereby caused to produce a rotating torque corresponding to the output of the signal converting device.

2 Claims, 6 Drawing Figures

TO U, V and W, FIG.5

INDUCTION MOTOR SPEED CONTROL APPARATUS

BACKGROUND OF THE INVENTION

1. Field of the Invention

The present invention relates to apparatus for controlling the rotational speed of an induction motor by changing the voltage applied to the motor.

2. Description of the Prior Art

It is known in the art that the voltage applied to an induction motor may be changed by controlling the firing angle of a thyristor connected between the induction motor and its power source whereby the rotational speed of the motor may be controlled. This, however, is impractical unless the load is of a positive polarity, i.e., the motor is required to produce a power-running torque to support such a load. In other words, if the load is of a negative polarity, i.e., the motor is required to produce a braking torque to support such a load, it is virtually impossible to control the speed of the load. This negative load appears in practice when a load such as, for example, an elevator cage, descends in its full load state. In such an event, as is known in the art direct-current power is usually supplied to the windings of the motor to establish a braking torque. (This is called DC braking.) The DC power is consumed as heat in the motor, resulting in an undesirable addition of heat to the motor.

SUMMARY OF THE INVENTION

Accordingly, one object of the present invention is to provide a new and improved apparatus for controlling the speed of an induction motor wherein if a load of a negative polarity is driven, the motor is regeneratively braked while the load runs at a constant speed whereby the heat produced in the motor is minimized and the power is economized.

Another object of the present invention is to provide an apparatus for controlling the speed of a load such as, for example, an elevator cage, without causing unpleasant shocks to the cage, by smoothly changing its speed from a power-run mode or regenerative braking-run mode to its DC braking-run mode at the beginning of deceleration.

The foregoing and other objects are attained in accordance with one aspect of the present invention through the provisions of an apparatus for smoothly controlling the speed of a load driven by an induction motor which includes means for generating a control signal corresponding to the difference between a predetermined speed command signal and a signal indicative of the actual speed of the load. A voltage corresponding to the control signal is applied to the motor during acceleration but ceases after acceleration begins in favor of a rated voltage being applied to the motor. Signal converting means provide a signal for allowing the motor to produce a rotating torque corresponding to the load.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

A preferred embodiment of the present invention as applied to an elevator speed control system will now be described.

Figure 1:
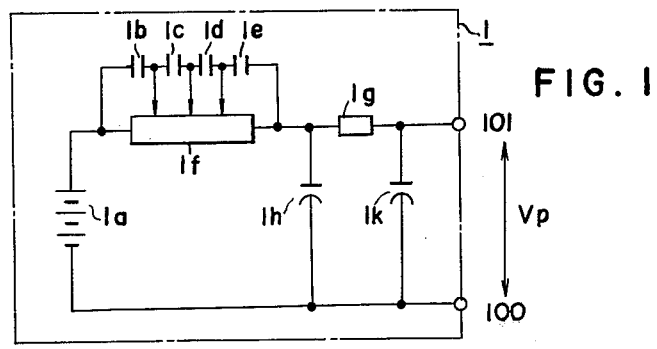
FIG. 1 is a circuit diagram according to the present invention of a speed command signal generating device for generating a speed command signal to an elevator.

Referring now to the drawings, wherein like reference numerals designate identical or corresponding parts throughout the several views, and more particularly to FIG. 1 thereof, the reference numeral 1 denotes a device for generating a signal $V_p$ for controlling the speed of an elevator cage (not shown) which comprises a power source 1a, normally open contacts 1b through 1e of accelerating and decelerating relays (not shown), resistors 1f and 1g, and capacitors 1h and 1k. The contacts 1b through 1e assume successive on-states while the cage is accelerating, or successive off-states while decelerating whereby the voltage of power source 1a is divided into various signal steps. These signals are passed through a filter consisting of resistors 1f and 1g and capacitors 1h and 1k to produce a continuous speed command signal $V_p$ across terminals 101 and 100.

Figure 2:
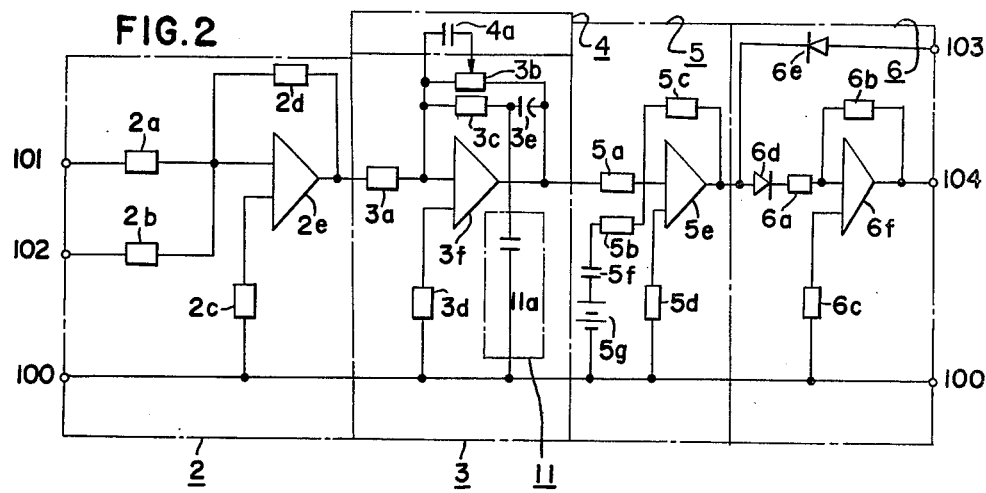
FIG. 2 is a circuit diagram of a computing device according to the present invention.

Referring now to FIG. 2, reference numeral 2 denotes an adder for adding together the speed command signal $V_p$ appearing across terminals 101 and 100 and a speed signal $V_T$ appearing across terminals 102 and 100, which is opposite in polarity to the signal $V_p$ and is proportional to the speed of the elevator cage as will be explained in more detail hereinafter. Adder 2 comprises resistors 2a through 2d, and an operational amplifier 2e. Reference numeral 3 represents an amplifier having a delay characteristic which comprises resistors 3a through 3d, a capacitor 3e, and an operational amplifier 3f. In this circuit, the static gain depends on the quotient resulting from the division of resistance 3b by resistance 3a, while the delay characteristic depends on the resistances 3a to 3c and capacitance 3e.

The reference numeral 4 denotes an amplification factor changing device comprising a normally open contact 4a of a relay (notshown) which is energized when the cage approaches the deceleration starting point and which is subsequently de-energized when the cage reaches the deceleration starting point Thus, changing the resistance of 3b when the contact 4a is in its closed state, the amplification factor of the amplifier 3 may be changed.

Further with reference to FIG. 2, the reference numeral 11 denotes a delay characteristic cancelling device comprising a normally open contact 11a of a relay (not shown) which is energized at the deceleration decision point, and which is de-energized at the deceleration starting point. Closing the contact 11a causes the amplifier 3 to lose its delay characteristic, i.e., to operate as a normal amplifier. At this stage of operation, the capacitor 3e is charged to a potential corresponding to the output of the amplifier 3.

Reference numeral 5 indicates a saturation signal generating device comprising resistors 5a through 5d, an operational amplifier 5e, a normally open contact 5f of a relay (not shown) which is energized at the end of acceleration and de-energized at the beginning of deceleration, and a power source 5g. In this circuit, when the contact 5f is open, the output of the amplifier 3 is yielded directly as the output of the saturation signal generating device 5. When the contact 5f is closed, the foregoing gate circuits on the power-running side are saturated irrespective of the output of the amplifier 3.

Still with reference to FIG. 2, reference numeral 6 denotes a distribution circuit comprising resistors 6a through 6c, diodes 6d and 6e, and an operational amplifier 6f. This circuit is capable of generating a negative output across terminals 104 and 100 when its input signal is positive, or across terminals 103 and 100 when its input signal is negative. The output across terminals 104 and 100 is supplied to the gate circuit of a braking thyristor, while the output across terminals 103 and 100 is supplied to the gate circuit of the power-running thyristor.

Figure 3:
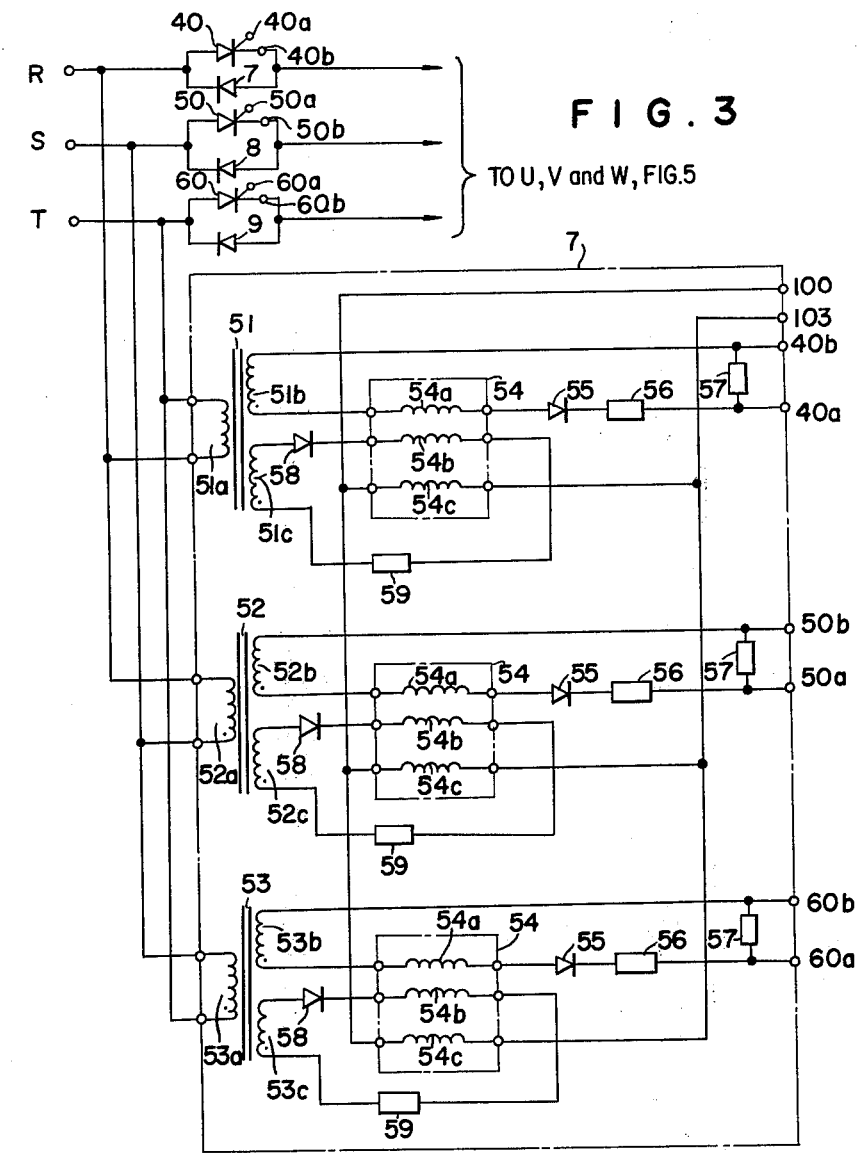
FIG. 3 is a circuit diagram according to the present invention which shows thyristors used to control the voltage applied to an induction motor for driving the elevator during a power-run, and further illustrating turn-on control circuits for the thyristors.

Referring now to FIG. 3, the reference numeral 7 denotes a turn-on control circuit on the side where the cage is in its power-run mode. This circuit comprises thyristors 40, 50 and 60, gates 40a, 50a and 60a, cathodes 40b, 50b and 60b and synchronous transformers 51 through 53 operated for the turn-on circuits of thyristors 40, 50 and 60, respectively. The transformer 51 is for the R-phase thyristor 40 and has its primary winding connected to the R- and T-phase lines. The transformer 52 is for the S-phase thyristor 50 and has its primary winding connected to the S- and R-phase lines. The transformer 53 is for the T-phase thyristor 60 and its primary winding connected to the T- and S-phase lines. The R-, S- and T-phase turn-on circuits are exactly the same in construction and hence only the R-phase turn-on circuit for thyristor 40 need be described.

Reference numeral 54 signifies a magnetic amplifier comprising an output winding 54a, a reset winding 54b, and a control winding 54c. Diodes 55 and 58, resistors 56, 57 and 59 and output terminal 40a and 40b complete the turn-on circuit for R-phase thyristor 40. The terminal 40a is connected to the gate 40a of thyristor 40, and the terminal 40b is connected to the cathode 40b thereof. The diode 55 is for blocking the gate inverse voltage while the thyristor 40 is being inversely biased. The output voltage of magnetic amplifier 54 is divided through resistors 56 and 57 and applied to the output terminals 40a and 40b of the turn-on circuit. The diode 58, reset winding 54b and resistor 59 constitute a reset circuit which resets the saturation of magnetic amplifier 54 while the thyristor 40 is being inversely biased.

A power-running signal from the distribution amplifer 6 of FIG. 2 is applied across input terminals 103 and 100 and thus a turn-on signal having a phase proportional to the current passing through the control winding 54c is obtained across the terminals 40a and 40b to control the thyristor 40.

Figure 4:
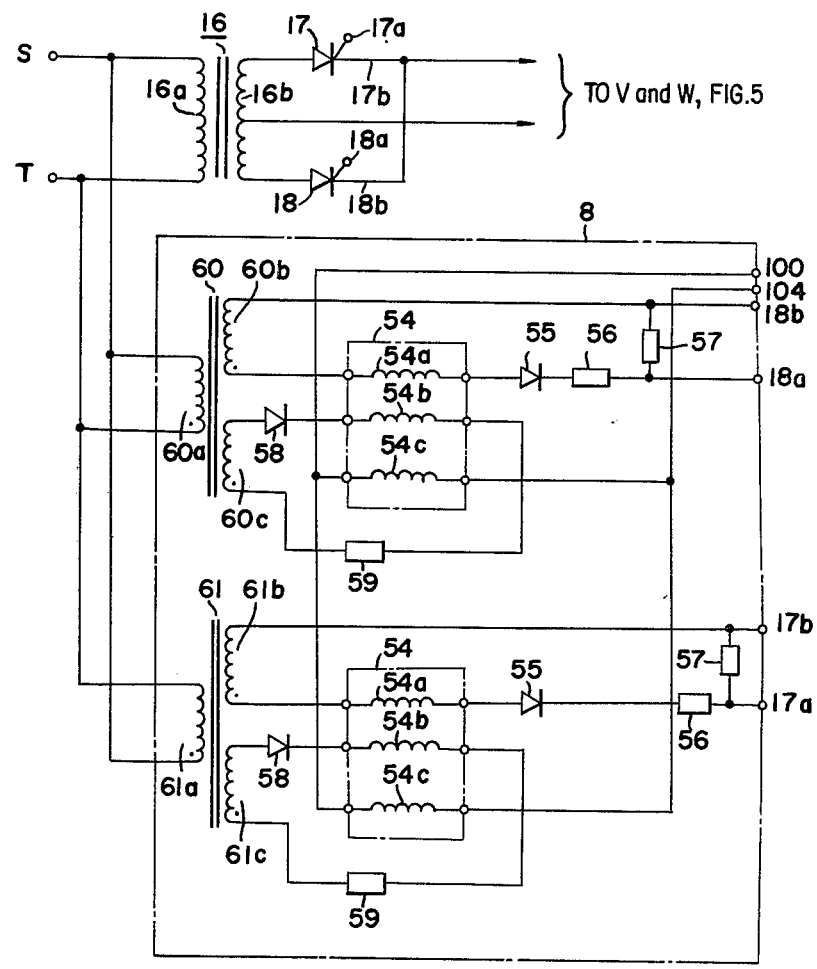
FIG. 4 is a circuit diagram according to the present invention of other thyristors used to control the voltage applied to the induction motor for driving the elevator during a braking-run, and further illustrating power transformers and turn-on control circuits for the thyristors.

FIG. 4 shows a circuit similar to the one shown in FIG. 3 which however is utilized to control the voltage to the induction motor during a braking run. Hereinafter only those components different from those shown in FIG. 3 need be described. In FIG. 4, the reference numeral 8 denotes a turn-on control circuit for the braking control mode, comprising control thyristors 17 and 18, gates 17a and 18a, and cathodes 17b and 18b. The reference numeral 60 denotes a synchronous signal transformer for the turn-on circuit of thyristor 18, and 61 denotes a synchronous signal transformer for the turn-on circuit of thyristor 17. A braking signal from the distribution amplifier 6 of FIG. 2 is applied across input terminal 104 and 100 to cause a turn-on signal having a phase proportional to the input to apppear between terminals 18a–18b and terminals 17a–17b to control the thyristors 17 and 18, as in the above-described turn-on circuit 7.

Figure 5:
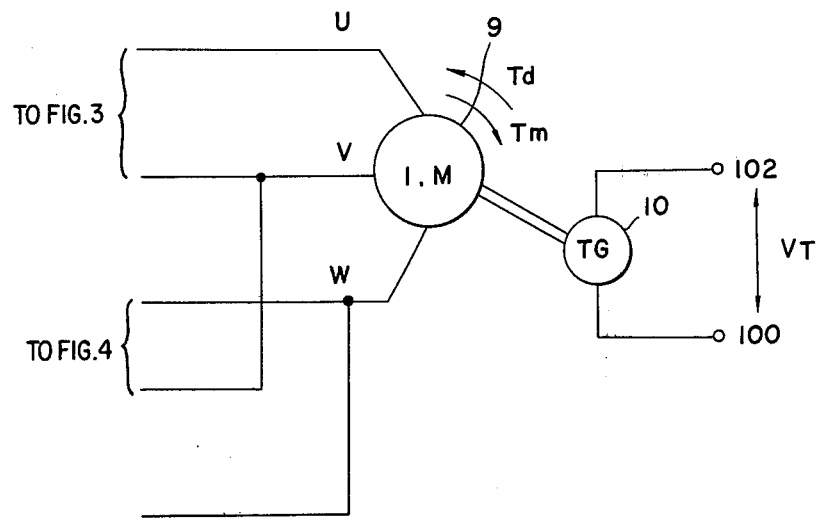
FIG. 5 is a diagram according to the present invention showing an elevator-driving induction motor and a device for transducing the rotational speed of the motor into a voltage.

Referring now to FIG. 5, the numeral 9 represents an induction motor for driving the elevator, and the reference letters U, V and W represent power source lines for the motor. Three-phase AC power comes through lines U, V and W to the motor during its power-run, as well as for a full-speed run. For a braking run, DC voltage is applied to lines V and W. The numeral 10 denotes a tachometer generator which is mechanically coupled to the motor 9 and generates across terminals 102 and 100 a voltage $V_T$ which is proportional to the rotational speed of the motor 9, i.e., the speed of the elevator cage.

Figure 6:
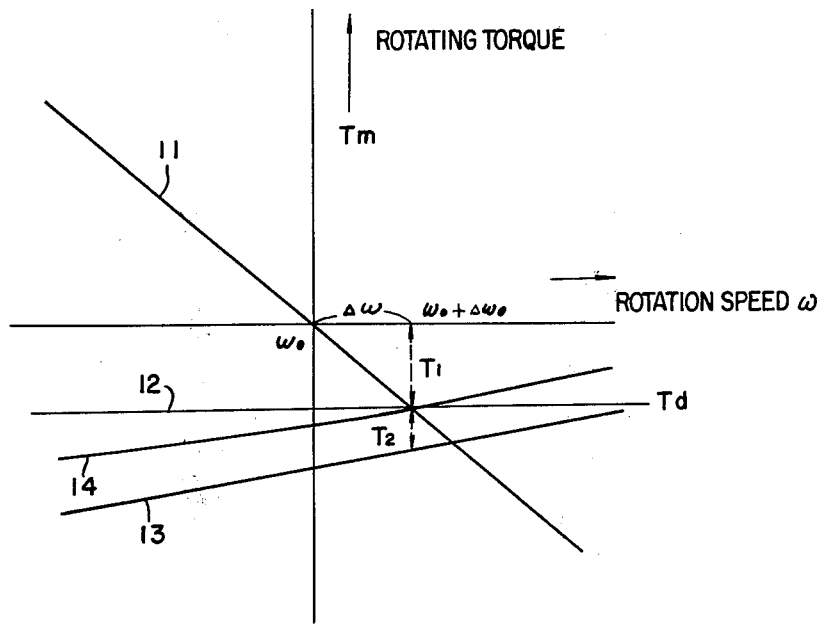
FIG. 6 is a graphic representation showing the rotating torque vs. rotational speed characteristic of the motor according to the principles of the present invention.

In FIG. 6, the numeral 11 indicates a characteristic curve showing the relationship between the motor rotating torque Tm and the rotation speed $\omega$. A characteristic curve 12 shows the relationship between the rotating torque Td (hereinafter referred to as load torque) imparted to the motor from a load which has a negative polarity, and the rotation speed $\omega$.

In operation, assume that the elevator cage is in its full load state. When the motor is actuated for downward rotation, the adder 2 compares the speed signal $V_T$ from the tachometer generator 10, with the speed command signal $V_p$ from the speed command signal generating device 1. The resultant difference signal is supplied to the amplifier 3. At this moment the difference signal is positive since $V_p > V_T$, and no signals are generated from the delay characteristic cancelling device 11, the amplification factor changing device 4 and the saturation signal generating device 5. Thus, the difference signal is duly amplified, suitably delayed, and applied to the turn-on control circuit 7 on the power-run side. This turn-on control circuit 7 is controlled according to the output signal from the distribution circuit 6, and the voltage applied to the motor is progressively increased thereby accelerating the motor. Simultaneously, the cage is accelerated according to the speed command signal $V_p$. At the moment that the acceleration of the cage ends, the saturation signal generating device 5 generates a saturation signal which is supplied to the distribution circuit 6. In this state, a rated voltage is applied to the motor irrespective of the value of the signal of the amplifier 3, and the motor will run at a speed of $\omega_o + \Delta\omega$, (higher by $\Delta\omega$ than the synchronized speed $\omega_o$) at which a braking torque equal to the load torque Td is produced. Thus the cage will descend at a constant speed. At this stage of operation, the speed command signal $V_p$ is set to a value corresponding to the synchronized speed $\omega_o$. In the above state, the motor is operating under regenerative braking in a known manner where power is returned to the power source, thereby reducing the heat produced in the motor.

When the cage begins decelerating, the contact 5f is opened, and the saturation signal generating device 5 generates an output equal to its input. In this condition, when the load and its direction are the same as above, the signal $V_p$ will be smaller than the signal $v_T$ and hence the output signal of saturation signal generating device 5 becomes positive to cause the distribution circuit 6 to operate the turn-on control circuit 8 in the braking mode. In practice, however, the output of the braking thyristors 17 and 18 is not always of a value sufficient to allow the motor to produce the rotating torque which meets the load torque. More specifically, at the moment the saturation signal vanishes, a signal corresponding to the value $(V_p-V_t) \times K_1$ is supplied to the turn-on control circuit 8 in the braking mode, wherein $V_t$=the speed signal corresponding to the rotation speed $\omega_o+\Delta\omega$ of the motor, $V_p$=the speed command signal; and $K_1$=the amplification factor of the computing device of FIG. 2. If a voltage is applied to the motor according to this signal, the motor will produce a braking torque as shown by the curve 13 of FIG. 6. Usually, this braking torque does not agree with the load torque Td at the rotation speed $\omega_o+\Delta\omega$. However, the torque $\Delta\omega$ is nearly proportional to the load torque and, hence the signal $(V_p-V_t) \times K_1$ will be proportional to the load torque. To illustrate the present invention more specifically, the speed control will now be described under the condition that the braking torque is larger than the load torque.

As is seen in FIG. 6, the motor produces a braking torque $T_1+T_2$ at the rotation speed $\omega_o + \Delta\omega$. Thus, when the saturation signal vanishes at the beginning of deceleration, the braking torque $T_2$ will be additionally exerted upon the load, causing a sharp shock to the elevator cage.

According to the present invention, however, the cage is free from shock at the beginning of deceleration. When the cage reaches the deceleration decision point while moving towards the deceleration starting point, the contact 4a of the amplification factor changing device 4 closes whereby the amplification factor of the computing device (FIG. 2) is changed to $K_2$, which is smaller than $K_1$. Then the capacitor 3e is charged so that the input signal to the braking turn-on control circuit 8 will assume the value $(V_p-V_t \times K_2$ at the moment the contact 5f of the saturation signal generating device 5 is opened. When a voltage is applied to the motor by this signal, the motor will produce a braking torque as indicated by the curve 14 of FIG. 6. The value of this torque is set to be $T_1$ of the rotation speed $\omega_o + \Delta\omega$. In this state, the contact 11a of the delay characteristic cancelling device 11 is closed. Therefore, the signal from the adder 2 will be supplied to the saturation signal generating device 5 without delay.

When the cage starts decelerating, the contact 5f and the saturation signal vanishes. As a result, the signal $(V_p-V_t) \times K_2$ will be supplied to the braking turn-on control circuit 8. As hereinbefore described, the output of the amplification factor changing device 4 vanishes simultaneously with the beginning of deceleration. Concurrently, the output of the delay characteristic cancelling device 11 also vanishes whereby the amplifier 3 restores its delay characteristic. Hence, the rotating torque of the motor will not be changed abruptly from $T_1$ to $T_1+T_2$, and accordingly, there is no possiblity of causing shock to the cage. After the foregoing step of operation, the motor decelerates progressively according to the speed command signal $V_p$. In this example, a braking torque along curve 13 at the rotation speed $\omega_o+\Delta\omega$ is larger than $T_1$. It is apparent that this braking torque may be smaller than $T_1$ in view of the principles of the present invention.

For the control of a load driven at a positive polarity (e.g., for an elevator cage driven upward at a rated load), the power-run torque of the motor after the disappearance of the saturation signal is made equal to the load torque by the use of amplification factor changing device 4.

As described above, the rotational speed of the motor driven while the cage is being run at a constant speed depends on the characteristic (i.e., the torque vs. slip characteristic) of the motor. Similarly, the rotational speed of the motor driven while the cage is accelerating or decelerating depends on the characteristic of the speed control system operated in a closed loop. Generally, however, it is often the case that when a load is imposed on the motor, the motor speed controlled by the speed control system through a speed command signal, which is generated in correspondence to the synchronous rotational speed of the motor, does not agree with the motor speed which depends on the characteristic of the motor driven at its rated voltage. This has resulted in a discontinuous point in the rotating torque of the motor. The present invention has solved this problem by smoothly changing the rotating torque of the motor, as described in detail above.

In the foregoing embodiment, the difference signal between the speed command signal $V_p$ generated for the motor driven at a rated voltage, and the speed signal $V_T$ is used in terms of the voltage proportional to the load, with which voltage the capacitance 3e is charged. The invention should not be limited to this signal, since any signal proportional to the load may be used instead. For example, a signal corresponding to the motor torque, the motor slip or the load in the cage may used without departing from the spirit or scope of the present invention.

Additionally, the timing at which signals are generated from the amplification factor changing device 4, the delay characteristic cancelling device 11, or the saturation signal generating device 5 is not to be limited to the foregoing preferred embodiment example, but these signals may, for example, be generated after acceleration ends.

According to the present invention, as has been described in detail above, a rated voltage is applied to the motor when a load having a negative polarity is driven at a constant speed by the motor whereby power is returned to the power source, heat produced in the motor is reduced, and power is economized.

Furthermore, according to the present invention, the signal necessary to allow the motor to produce a rotating torque corresponding to the load is preset at the stage of load deceleration, and a voltage is applied to the motor by the preset signal upon deceleration whereby the torque will be continuously changed and smooth deceleration will be realized without causing any shock to the cage.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the U.S. is:

1. Apparatus for controlling the speed of an induction motor comprising:
   an induction motor,
   a load having a negative polarity coupled to the induction motor,
   means for generating a speed signal corresponding to the speed of the load,
   means for generating a predetermined speed command signal,
   adder circuit means for generating a difference signal between the speed signal corresponding to the speed of the load and the predetermined speed command signal,
   amplifier circuit means with a delay characteristic for amplifying and delaying the difference signal,
   the amplifier circuit means having a delay characteristic cancelling device,
   means for energizing the delay characteristic cancelling device after the load is accelerated and for deenergizing the delay characteristic cancelling device at the deceleration starting point of the load,
   the amplifier circuit means having an amplification character changing device,
   means for energizing the amplification character changing device after the load is accelerated and for deenergizing the amplification character changing device at the deceleration starting point of the load,
   a saturation signal generating circuit having an input connected to the output of the amplifier circuit means,
   means for energizing the saturation signal generating circuit after the load is accelerated and for deenergizing the saturation signal generating circuit at the deceleration starting point of the load,
   a distribution circuit having an input connected to the output of the saturation signal generating circuit and first and second outputs,
   a turn-on control circuit for applying voltage to the induction motor during a power run mode and for applying rated voltage to the induction motor during the time the saturation signal generating circuit is energized having an input connected to the first output of the distribution circuit,
   a turn-on control circuit for applying voltage to the induction motor during a DC braking mode having an input connected to the second output of the distribution circuit.

2. Apparatus for controlling the speed of an induction motor comprising:
   an induction motor,
   a load having a negative polarity coupled to the induction motor,
   means for generating a speed signal corresponding to the speed of the load,
   means for generating a predetermind speed command signal,
   adder circuit means for generating a difference signal between the speed signal corresponding to the speed of the load and the predetermined speed command signal,
   amplifier circuit means with a delay characteristic for amplifying and delaying the difference signal,
   the amplifier circuit means having a delay characteristic and a delay characteristic cancelling device,
   means for energizing the delay characteristic cancelling device at the deceleration decision point of the load and for deenergizing the delay characteristic cancelling device at the deceleration starting point of the load,
   the amplifier circuit means having an amplification character changing device,
   means for energizing the amplification character changing device as the load approaches the deceleration point and for deenergizing the amplification character changing device when the load reaches the deceleration point,
   a saturation signal generating circuit having an input connected to the output of the amplifier circuit means,
   means for energizing the saturation signal generating circuit at the end of acceleration of the load and for deenergizing the saturation signal generating circuit at the beginning of deceleration of the load,
   a distribution circuit having an input connected to the output of the saturation signal generating circuit and first and second outputs,
   the distribution circuit generating a negative signal on the first output when the input thereto is negative,
   the distribution circuit generating a negative signal on the second output when the input thereto is negative,
   a turn-on control circuit for applying voltage to the induction motor during a power-run mode having an input connected to the first output of the distribution circuit, and
   a turn-on control circuit for applying voltage to the induction motor during a braking-run mode having an input connected to the second output of the distribution circuit.

* * * * *